United States Patent [19]
Roberts et al.

[11] Patent Number: 6,159,384
[45] Date of Patent: *Dec. 12, 2000

[54] METHODS AND APPARATUS FOR MONITORING A FILTER BED BY DIFFERENTIAL PRESSURE

[75] Inventors: R. Lee Roberts, Chadds Ford; John D. Simmons, Drexel Hill, both of Pa.

[73] Assignee: RG, Delaware, Inc., Wilmington, Del.

[*] Notice: This patent is subject to a terminal disclaimer.

[21] Appl. No.: 09/422,659

[22] Filed: Oct. 22, 1999

Related U.S. Application Data

[63] Continuation of application No. 08/967,355, Nov. 7, 1997, Pat. No. 5,980,755.

[51] Int. Cl.[7] .................................................. B01D 35/43
[52] U.S. Cl. ..................... 210/741; 73/61.69; 73/717; 210/90; 210/275; 210/741; 210/745; 210/793
[58] Field of Search ..................... 210/85, 90, 94, 210/96.1, 108, 143, 275, 277, 293, 739, 741, 744, 745, 792, 793, 749; 73/147, 716, 717, 756, 864, 342, 61.69, 700, 723, 753, 768, 769, 784; 356/440, 441, 442

[56] References Cited

U.S. PATENT DOCUMENTS

| | | | |
|---|---|---|---|
| 2,858,024 | 10/1958 | Babcock | 210/108 |
| 3,618,766 | 11/1971 | Morey | 210/96.1 |
| 3,831,755 | 8/1974 | Goodman et al. | 210/108 |
| 4,006,988 | 2/1977 | Tamm . | |
| 4,187,175 | 2/1980 | Roberts et al. | 210/275 |
| 4,524,626 | 6/1985 | Pabst et al. | 73/784 |
| 4,583,820 | 4/1986 | Handy et al. | 73/784 |
| 4,662,213 | 5/1987 | Handy et al. | 73/716 |
| 5,147,560 | 9/1992 | Nichols | 210/745 |
| 5,234,600 | 8/1993 | Kupke | 210/744 |
| 5,751,424 | 5/1998 | Bostater | 356/342 |
| 5,980,755 | 11/1999 | Roberts et al. | 210/741 |

*Primary Examiner*—Joseph W. Drodge
*Attorney, Agent, or Firm*—Merek & Voorhees

[57] ABSTRACT

A differential pressure monitor measures the pressure at a plurality of heights in a filter bed. A preferred embodiment of the monitor comprises an elongated body, a plurality of pressure sensors located on the elongated body for obtaining the pressure readings, a control apparatus for determining differential pressures from the pressure readings, each differential pressure being the difference in pressure between pressures measured at two different heights in the filter bed, and transmission apparatus to transmit the pressure readings from the pressure sensors to the control apparatus. Methods of monitoring and controlling the performance of a filter bed during filtration and during backwashing also are provided. Two such methods include measuring turbidity levels in a filter bed and obtaining water samples from a filter bed.

33 Claims, 3 Drawing Sheets

METHODS AND APPARATUS FOR MONITORING A FILTER BED BY DIFFERENTIAL PRESSURE

This is a continuation of U.S. patent application Ser. No. 08/967,355 filed on Nov. 7, 1997 now U.S. Pat. No. 5,980,755.

FIELD OF THE INVENTION

The present invention relates to filters, and more particularly to monitoring a filter bed for more efficient filtering and backwashing operations.

BACKGROUND OF THE INVENTION

Filters and the like that use a bed of filter media to remove solids from liquids are well known. Such systems typically include a liquid distribution system that collects liquid after it is filtered in one flow direction and distributes clean liquid through the filter media in a reverse flow direction to effect a cleaning process known as backwashing.

Water filtration systems of the gravity type are commonly employed for filtering high volumetric flow rates of water, e.g., in municipal and industrial water treatment and waste water treatment plants. The filtration systems generally comprise one or more filters, each employing a bed of granular filter media for filtering a liquid as it seeps downward through the filter bed.

Each filtration system generally comprises an open filter basin having a floor and vertical walls surrounding the floor and an underdrain positioned directly above the floor. The underdrain defines a perforated false bottom in the basin for supporting the filter bed and to provide a system of fluid passageways for removing the filtered water from the bottom of the filter basin.

The filter bed is generally several feet deep and comprises successive layers of gravel and sand of graduated sizes. A layer of relatively coarse gravel is provided at the bottom of the filter bed, lying on the upper surface of the underdrain. This layer of support gravel is provided in progressively finer sizes toward the top of the filter bed so that media is not lost by penetrating the layer of support gravel.

On top of the support gravel would rest the bed of filter media, which can contain one or several types of media material. Typically, the bottom-most layer consists of finer media having higher specific gravity relative to the uppermost layer, which consists of coarser media having a lower specific gravity.

During operation of the filtration system, the influent, i.e., unfiltered water, is directed into the filter basin to a is depth of several feet above the upper layer of filter media. The influent is allowed to flow downward though the filter bed. During this process, the suspended materials in the unfiltered water become trapped in the filter media. The water ultimately reaches the bottom of the filter bed and passes through the perforations in the underdrain system. The water is then collected in a system of fluid passageways within the underdrain system and is carried out of the filter basin through a suitable conduit or flume.

After the filtration system is operated for an extent of time, the efficiency of the system decreases and it becomes necessary to wash the filter bed to remove the foreign materials trapped therein. Washing of the filter media is accomplished by utilizing a backwashing process. The backwashing process involves pumping pressurized water and/or air through the flume in a reverse direction into the system of fluid passageways in the underdrain system, upward through the perforations in the underdrain, and into the overlying filter bed.

When fluidization has been achieved, the wash water flowing upward through the filter bed carries the foreign articles upward from the filter bed. Fluidization is achieved when the bed of filter media reaches complete expansion. Complete expansion occurs when the rate of water pumped into the bed has a velocity that is just strong enough to keep the filter media suspended. Typically, fluidization is not achieved until the bed expands to at least approximately 30%, maybe not until 50% expansion, and sometimes up to 100% expansion is required. The wash water and the foreign materials entrained or suspended therein are then collected at the top of the filter basin in a waste trough and carried away.

The backwashing process must be performed under carefully controlled conditions so as to achieve effective cleaning of the filter bed while avoiding disruption or damage. When water is used in the backwashing procedure, it is first pumped into the filter bed at a relatively slow rate and increased until fluidization is achieved. At this particular flow rate, the velocity of the water and its density and viscosity will fluidize or lift the particles, thereby expanding the bed of filter media so as to allow the flow of water to easily carry away the foreign particles. This fluidization rate is then kept constant for approximately 5 to 7 minutes while backwashing is performed. The filter bed is then ready for filtering operation and the cycle continues for the life of the bed.

To maximize the potential life of a filter bed, it must be washed properly. Proper washing entails backwashing at or very near the fluidization rate. Underfluidization, backwashing at a rate below the fluidization rate, results in ineffective cleaning because without complete bed expansion for fluidization, some foreign particles remain trapped among the filter media no matter how long one performs the backwashing process. Underfluidization may also result in a non-uniform distribution of wash water throughout the filter bed, thus not effecting a complete washing of the entire filter bed. If the wash water distribution is uneven so that dead spots occur at certain locations within the filter bed, then those portions of the filter bed will not be properly cleansed, thereby reducing the efficiency of the filter.

Overfluidization, backwashing at a rate above the fluidization rate, results in potential loss of filter media because the force of the water will simply cause the filter media to become entrained in the wash water along with the removed materials and carried away as waste. "Blow holes," in which explosive bursts of wash water open channels in the filter media at the initiation of the backwashing cycle, must also be avoided. During filtration, these blow holes allow influent to pass through the filter media without being filtered and allow finely-sized filter media to be carried away with the effluent, i.e., the filtered water.

It is known in the art that there is no head loss across a bed of filter media, i.e., vertically across, when the bed is fluidized. That is, the differential pressure between the pressure at the top of the layer of support gravel and the pressure at a certain distance above the upper-most layer of media approaches a constant value as the bed approaches 100% fluidization. Thus, if one is monitoring the differential pressure across the bed of filter media while increasing the rate of water flow into the filter bed, one can determine when fluidization occurs and then begin backwashing at that determined rate.

The prior art apparatus used to measure the differential pressure across the entire filter bed comprises a pipe and a transmitter for each point to be measured. To install one of these prior art transmitters, one has to pierce the wall of the filter basin at the appropriate height level of measurement, placing the pipe perpendicular to the direction of the flow and directing the transmitter, placed on the end of the pipe, against the direction of flow. Typically, these transmitters are simple manometers. Installing the prior art devices is an unnecessarily burdensome endeavor requiring significant man-hours and modifications to a filter basin. Moreover, the prior art transmitter can not be installed on a functioning filter bed or one with a bed of filter media already in place. Thus, it is desirable to provide a user-friendly device for measuring the differential pressure across a filter bed that can be installed in a retro-fit manner.

As a result of the rather involved task of utilizing this prior art technique, it was seldom, if ever, used. Thus, to determine the proper fluidization rate for a given filter bed, the prior art technique is to first measure the temperature of the water in the filter bed. From this temperature measurement, one can approximate the density and viscosity of the water at that temperature using generally available references. From there, and knowing the average size of the filter media in the bed, one can use an American Water Works Standards reference to find the flow rate needed to expand the filter bed, i.e., the fluidization rate.

Unsurprisingly, the above prior art technique is highly unreliable in determining the fluidization rate for a given filter bed. Thus, it is also desirable to provide a device for measuring the differential pressure across a filter bed so as to monitor a filter bed and achieve efficient control of filtration and backwashing procedures.

SUMMARY OF THE INVENTION

A differential pressure monitor for measuring the pressure at a plurality of heights in a filter bed is provided. A preferred embodiment of the monitor comprises an elongated body, a plurality of pressure sensors located on the elongated body for obtaining the pressure readings, a control means for determining differential pressures from the pressure readings, each differential pressure being the difference in pressure between pressures measured at two different heights in the filter bed, and transmission means to transmit the pressure readings from the pressure sensors to the control means.

Preferably, there are three pressure sensors for obtaining pressure readings at three corresponding locations during filtration and for obtaining pressure readings at the three locations during backwashing. In this preferred embodiment, the three locations are: (1) at a distance adjacent to and vertically above an upper layer of two layers of filter media so as to accurately measure the pressure at a top surface of the upper layer of filter media; (2) at an interface of the upper layer of filter media and a lower layer of the two layers of filter media; and (3) at a point near a bottom surface of the lower layer of filter media. The pressures measured at these preferred locations are $p1$, $p2$ and $p3$, respectively.

A method of monitoring and controlling the performance of a filter bed during filtration is also provided. A preferred method, to achieve more efficient backwashing and filtration operation, comprises the steps of: (a) providing a differential pressure monitor according to the present invention; (b) starting filtration by introducing influent to the liquid filtration system at the top of the liquid filtration system; (c) monitoring pressure readings $p1$, $p2$, and $p3$ at periodic intervals and recording such measurements on the control means to obtain a characteristic profile of the filter bed during filtration.

If differential pressure $p2-p3$ increases non-linearly versus time, the method further comprises the additional step of either (i) backwashing using a higher rate of water flow in an attempt to fully fluidize the filter bed during backwashing, or (ii) backwashing for a longer period of time during backwashing. If differential pressure $p1-p2$ increases non-linearly versus time, the method further comprises the additional step of either (i) skimming more particles off the top of the liquid filtration system during backwashing, or (ii) utilizing less chemicals, the chemicals used to facilitate treatment, during filtration. If differential pressure $p2-p3$ increases greater than $p1-p2$ increases, the method further comprises the additional step of either (i) backwashing using a higher rate of water flow in an attempt to fully fluidize the filter bed during backwashing, or backwashing for a longer period of time during backwashing. The method further comprises the additional step of stopping filtration when differential pressure $p1-p3$ approaches critical head loss, the critical head loss being a point at which liquid is no longer being filtered.

A method of monitoring and controlling the performance of a filter bed during backwashing is also provided. A preferred method, to achieve more efficient backwashing and filtration operation, comprises the steps of: (a) providing a differential pressure monitor according to the present invention; (b) pumping water in an upward direction in through the bottom of the liquid filtration system and through the filter bed at a relatively slow rate of flow; (c) gradually increasing the rate of flow of water being pumped into the liquid filtration system; (e) periodically measuring pressure readings $p1$, $p2$, and $p3$; (f) recording the pressure readings on the control means to obtain a characteristic profile of the filter bed during backwashing; and (g) monitoring differential pressure $p3-p1$ to determine a backwash differential pressure and when it approaches a constant value, starting backwashing at the rate of water flow being pumped into the liquid filtration system to achieve the backwash differential pressure.

In alternate embodiments of the present invention, a method of measuring turbidity readings at different locations in a filter bed is provided. This method utilizes a turbidity monitor, which is the same as the differential pressure monitor of the present invention except that turbidity sensors replace the pressure sensors.

In another alternate embodiment of the present invention, a method of obtaining water samples at different locations in a filter bed is provided. This method utilizes a water sampling device having an elongated body according to the present invention through which water is drawn out of the filter bed.

A major advantage of the devices of the present invention is that they can be easily installed on an existing filter bed that is already in operation. The devices are simply placed in the filter bed through the top of the liquid filtration system and if and when desired, removed from the filter bed through the top of the liquid filtration system. This procedure does not require piercing the walls of the filter bed.

DETAILED DESCRIPTION OF THE PREFERRED EMBODIMENTS

Figure 1:
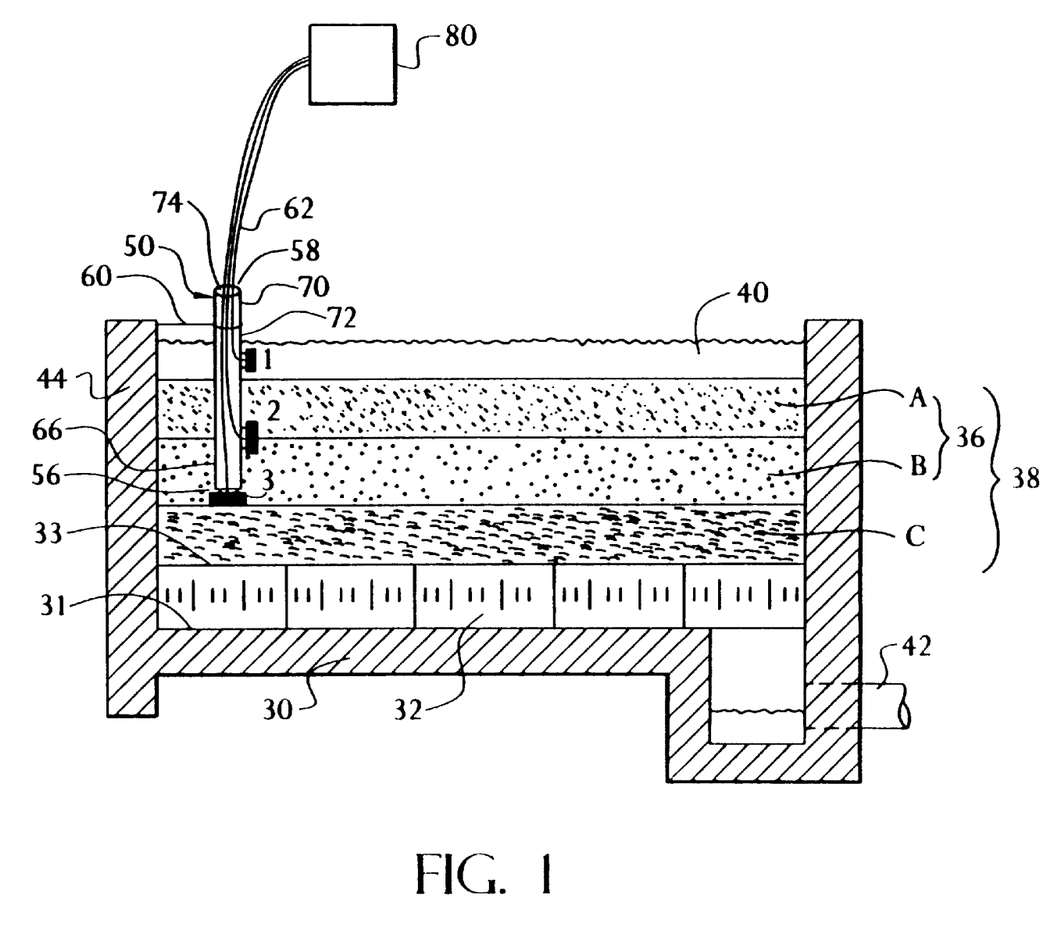
FIG. 1 is a cross-sectional view of the side of a filtration system in cooperation with a differential pressure monitor according to the present invention.

Referring to the drawings, wherein like numerals indicate like elements, there is shown in FIG. 1 a cross-sectional view of the side of a filtration system in cooperation with a differential pressure monitor 50 according to the present invention. The filtration system shown in FIG. 1 comprises a filter basin 30, a flume 42, and an underdrain system 32 directly above the floor 31 of the basin 30.

The underdrain 32 defines a perforated false bottom in the basin 30 for supporting a filter bed 38 and to provide a system of fluid passageways for removing the filtered water from the bottom of the filter basin 30. The filter bed 38 is generally several feet deep and comprises successive layers of gravel and sand of graduated sizes.

A layer of relatively coarse gravel C is provided at the bottom of the filter bed, lying on the upper surface 33 of the underdrain 32. This layer of support gravel C is provided in progressively finer sizes toward the top of the filter bed 38 so that media is not lost by penetrating the layer of support gravel C. It should be noted, however, that depending on the type of underdrain, this layer of support gravel C may not be required.

The filter bed 38 comprises the layer of support gravel C and a bed of filter media 36, which rests upon the layer of support gravel C. For illustrative purposes only, the filter bed 38 shown in FIG. 1 is a dual-media filter bed having layers of filter media A and B. Typically, the lower layer B consists of finer media having higher specific gravity relative to the upper layer A, which consists of coarser media having lower specific gravity media.

FIG. 1 also shows an amount of influent 40, i.e., unfiltered water, that has recently been introduced to the system. During operation of the filtration system, the water 40 is directed into the filter basin 30 to a depth of several feet above the upper layer of filter media 36. The water 40 is allowed to flow downward though the filter bed 36. During this process, the suspended materials in the water 40 become trapped in the filter media 36. The effluent, i.e., filtered water, ultimately reaches the bottom of the filter bed 36 and passes through the perforations in the underdrain system 32. The water is then collected in a system of fluid passageways within the underdrain system 32 and is carried out of the filter basin 30 through a suitable conduit or flume 42.

After the filtration system is operated for an extent of time, the efficiency of the system decreases and it becomes necessary to wash the filter bed 36 to remove material trapped therein. Washing of the filter media 36 is accomplished by utilizing a backwashing process. The backwashing process involves pumping pressurized water and/or air through the flume 42 in a reverse direction into the system of fluid passageways in the underdrain system 30, upward through the perforations in the underdrain 32, and into the overlying filter bed 36. The wash water flowing upward through the filter bed 36 carries the trapped materials upward from the filter bed 36. The wash water and the materials entrained or suspended therein are then collected at the top of the filter basin 30 and carried away.

When fluidization has been achieved, the wash water flowing upward through the filter bed 38 carries the foreign materials upward from the filter bed 38. Fluidization is achieved when the bed of filter media 36 reaches complete expansion. Complete expansion occurs when the rate of water pumped into the bed has a velocity that is just strong enough to keep the filter media 36 suspended. Typically, fluidization is not achieved until the bed 38 expands to at least approximately 30%, maybe not until 50% expansion, and sometimes up to 100% expansion is required. The wash water and the foreign materials entrained or suspended therein are then collected at the top of the filter basin 30 in a waste trough (not shown) and carried away.

The backwashing process must be performed under carefully controlled conditions so as to achieve effective cleaning of the filter bed 38 while avoiding disruption or damage. When water is used in the backwashing procedure, it is first pumped into the filter bed 38 at a relatively slow rate and increased until fluidization is achieved. At this particular flow rate, the velocity of the water and its density and viscosity will fluidize or lift the particles, thereby expanding the bed of filter media 36 so as to allow the flow of water to easily carry away the foreign particles.

This fluidization rate is then kept constant for approximately 5 to 7 minutes while backwashing is performed. This length of time is a recommended time period based upon prior experimentation. A monitor is typically used to measure the visual turbidity, i.e., clarity, of the waste water which is carried away via the trough during the backwashing step. The backwashing procedure is done when the visual turbidity of the waste water reaches a level of relative clarity. The filter bed 38 is then ready for filtering operation and the cycle continues for the life of the bed 38.

To maximize the potential life of a filter bed, it must be washed properly. Proper washing entails backwashing at or very near the fluidization rate. Underfluidization, backwashing at a rate below the fluidization rate, results in ineffective cleaning because without complete bed expansion for fluidization, some foreign particles remain trapped among the filter media 36 no matter how long one performs the backwashing process. Underfluidization may also result in a non-uniform distribution of wash water throughout the filter bed 38, thus not effecting a complete washing of the entire filter bed. If the wash water distribution is uneven so that dead spots occur at certain locations within the filter bed, then those portions of the filter bed 38 will not be properly cleansed, thereby reducing the efficiency of the filter.

Overfluidization, backwashing at a rate above the fluidization rate, results in potential loss of filter media because the force of the water will simply cause the filter media 36 to become entrained in the wash water along with the removed materials and carried away as waste. "Blow holes," in which explosive bursts of wash water open channels in the filter media 36 at the initiation of the backwashing cycle, must also be avoided. During filtration, these blow holes allow influent to pass through the filter media 36 without being filtered and allow finely-sized filter media to be carried away with the effluent.

It is known in the art that there is no head loss across the bed of filter media 36, i.e., vertically across, when the bed 36 is fluidized. That is, the differential pressure between the pressure at a location 3 on top of the layer of support gravel C and the pressure at a certain location 1 above the top layer of media A approaches a constant value as the bed 36 approaches 100% fluidization. Thus, if one is monitoring the differential pressure across the bed of filter media 36 while increasing the rate of water flow into the filter bed 38, one can determine when fluidization occurs and then begin backwashing at that determined rate.

The present invention allows for easy and effective monitoring and control of a filtration system by measuring the differential pressure across the bed of filter media 36. The method of determining the proper fluidization rate for the filter bed 38 for achieving proper backwashing results comprises monitoring the differential pressure across the bed of filter media 36 while increasing the rate of water flow into the filter bed 38.

As the rate of water flow pumped into the filter bed 38 is gradually increased, the pressure is measured at three locations in the filter bed 38: (1) at a location 1 above the top layer of media A; (2) at a location 2 in between media layer A and media layer B; and (3) at a location 3 between media layer B and the layer of support gravel C. The pressures at these three locations 1, 2 and 3 are p1, p2 and p3, respectively, and are preferably measured at intervals of approximately 5 to 15 minutes.

Figure 2:
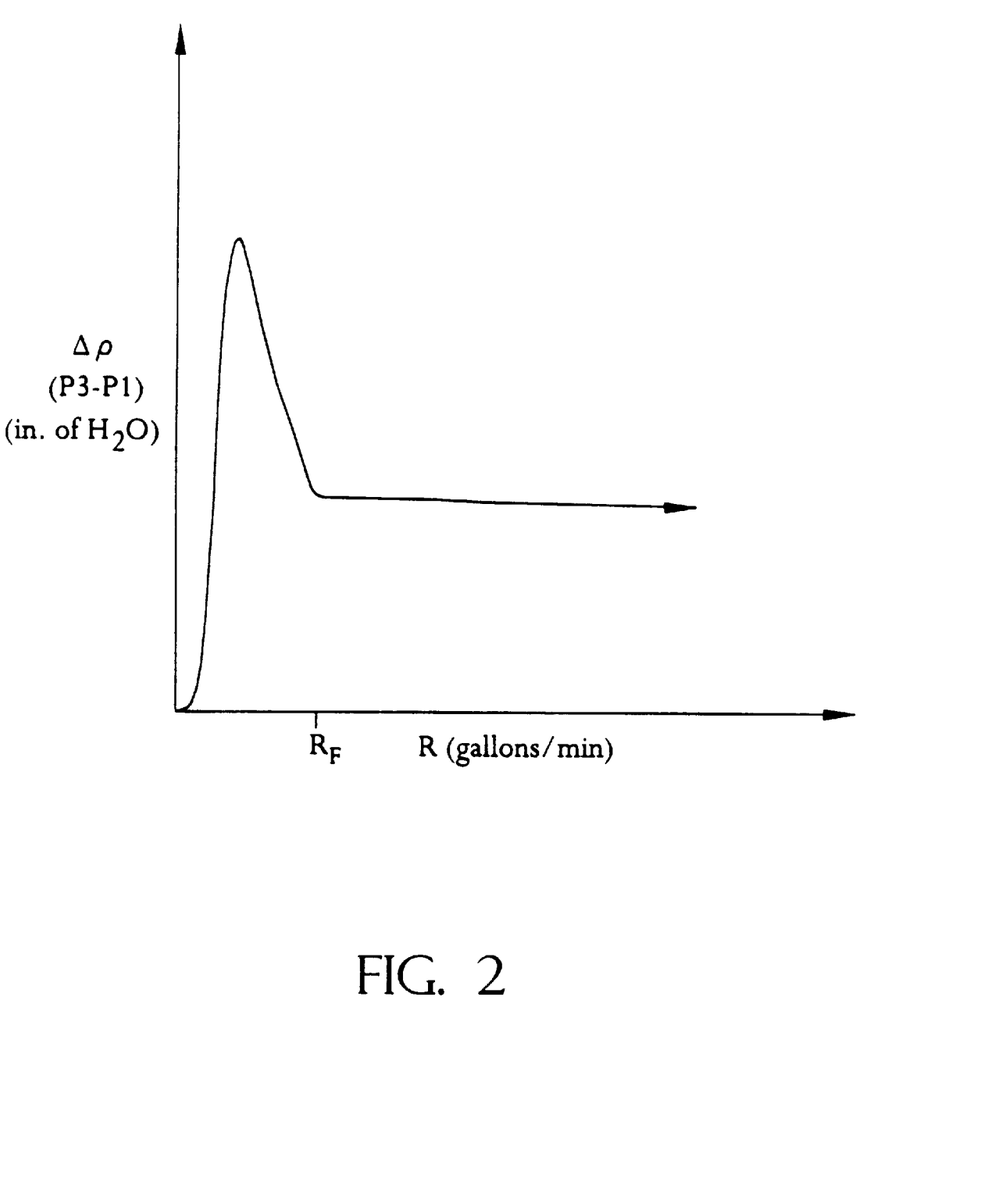
FIG. 2 is an exemplary graph of differential pressure across a bed of filter media versus fluidization as the rate of water flow pumped into the filter bed is increased.

The differential pressure across the entire bed of filter media 36 or backwash differential pressure, p3–p1, approaches a constant value when the bed 36 is fluidized. FIG. 2 shows an exemplary graph of differential pressure $\Delta p$ across a bed of filter media 36 versus fluidization F as the rate of water flow pumped into the filter bed 38 is increased. As mentioned above, backwashing is then performed at the fluidization rate $R_F$ when the backwash differential p3–p1 approaches a constant value. One can also determine when each layer of media is fluidized. The bottom layer of media B is fluidized when p3–p2 approaches a constant value and the top layer of media A is fluidized when p2–p1 approaches a constant value.

After backwashing for the necessary period of time of approximately 5 to 7 minutes at the fluidization rate $R_F$, filtering can begin again. Filtration is halted when the differential pressure across the bed of filter media 36, p1–p3, approaches critical head loss. Critical head loss is the point at which water is no longer being filtered and is typically a known value, approximately 80 to 100 inches of water column.

A major benefit of monitoring the pressures p1, p2 and p3 across the bed of filter media 36 during filtration is that one can obtain a characteristic profile of the filter bed 38. To achieve a detailed profile, the pressure readings should be taken at intervals of approximately 5 to 15 minutes. These diagnostic readings provide the diagnostic information necessary to improve backwashing procedures or the efficiency of the filter by improving the manner in which chemical feeds are introduced to the system. Various polymers and other S chemicals, such as alum are used in the process chain to facilitate treatment of the water. With the diagnostic information, one will be able to optimize filter performance.

During filtration, if the differential pressure p1–p3 across the bed of filter media increases in a non-linear fashion, this may signal that the filter bed 38 was not backwashed properly. If the differential pressure p2–p3 across the bottom layer B of filter media 36 increases non-linearly, it could indicate that there was either underfluidization during backwashing or the backwashing was performed for less than the necessary period of time. If the differential pressure p1–p2 across the top layer A of filter media 36 increases non-linearly, it could mean that the foreign particles were not skimmed off the top of the filter bed 38 properly during installation or that chemicals were overfed. In addition, if p2–p3 increases at a rate greater than p1–p2 increases, it could indicate that there was also either underfluidization during backwashing or the backwashing was performed for less than the necessary period of time.

Poor backwashing procedures shortens the length of the filtration runs and over time, shortens the life of the filter bed 38. When chemicals are overfed, filtering is only taking place at the top of the filter bed 38. If the pressure differential p2–p3 in the bottom layer B of filter media 36 increases too quickly relative to the differential pressure p1–p2 across top layer A, then the bottom layer B was probably never fully fluidized and thus the heavy particles were never lifted out.

As shown in FIG. 1, a preferred embodiment of the differential pressure monitor 50 according to the present invention has an elongated body 70, three pressure sensors 56 mounted on the body 70, a control means 80, and a supporting member 60. The supporting member 60 holds the monitor 50 in place in the filter bed 36 above the underdrain system 32. A first end of the supporting member 60 is affixed to the filtration system, preferably the side wall 44 of the filter basin 30, and a second end of the supporting member 60 is affixed to the elongated body 70. Preferably, the supporting member 60 is an instrument mounting bracket.

The elongated body 70 has an open end 58 for transmission of the pressure sensor 56 signals, and an open sidewall 72 defining an inner cavity 74 which is filled with sealant. If so desired, sealant or a water stopper can be used to ensure that water does not pass through the inner cavity 74 of the elongated body 70. Preferably, the elongated body 70 is a cylindrical body 70, as shown in FIG. 1, and the submerged end 66 is closed and a pressure sensor 56 is proximate the lower end.

Each pressure sensor 56 has a transmission means 62, which is preferably a cable 62, extending from the height in the filter bed 38 at which it is measuring, through the inner cavity 74, and out through the open end 58 of the cylindrical body 70. Three of the pressure sensors 56 measure the pressure at locations 1, 2 and 3 during filtration and the same three measure the pressure at locations 1, 2 and 3 during backwashing. Preferably, the pressure sensors 56 are pressure diaphragms 56. The cable 62 from each pressure diaphragm 56 converge at the control means 80, which is preferably a calculating and/or transmitting device 80, where the differential pressures during both filtration and backwashing are calculated and a characteristic profile for the filter bed is obtained.

Figure 3:
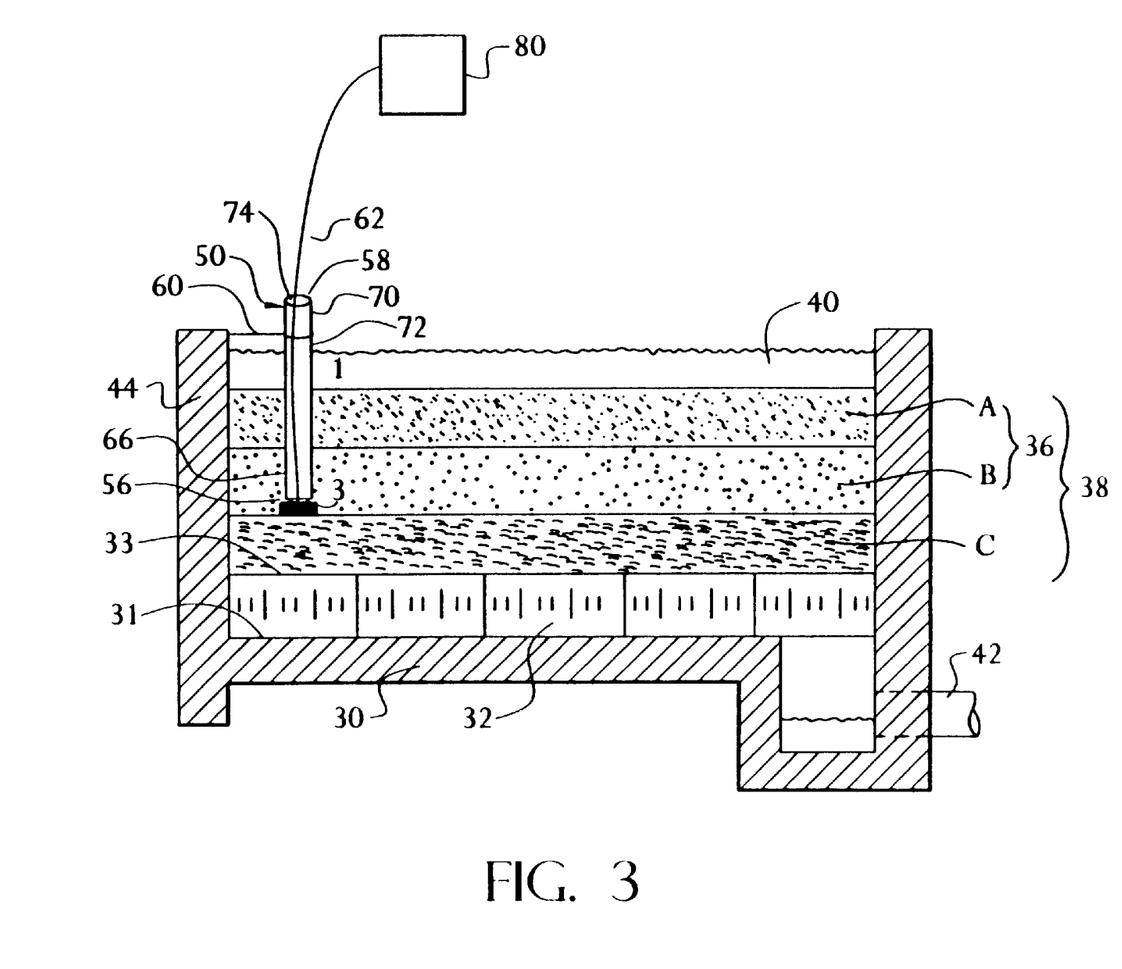
FIG. 3 is a cross-sectional view of the side of a filtration system in cooperation with an alternate embodiment of the differential pressure monitor according to the present invention.

Shown in FIG. 3 is a cross-sectional view of the side of a filtration system in cooperation with an alternate embodiment of the differential pressure monitor 50 according to the present invention. In a very simplistic form, the proposed differential pressure monitor 50 could use one pressure sensor 56 mounted at the submerged end of the cylindrical body 70. As shown in FIG. 3, p1 is merely the static pressure at the normal operating level, and p3 is the pressure as indicated from the single pressure sensor 56 at the location between media layer B and the layer of support gravel C. With this simple embodiment of the differential pressure monitor 50, the differential pressure p1–p3 across the bed of filter media 36 during filtration and the backwash differential pressure p3–p1 during backwashing can be calculated, assuming that a constant operating level of water 40 is maintained in the filtration system.

Another alternate embodiment of the differential pressure monitor 50 according to the present invention has more than three pressure sensors for obtaining a characteristic profile for a filter bed having more than two layers of media. Such an alternative embodiment can also be used to obtain a more detailed profile of a dual-media filter bed, as shown in FIG. 1, or another poly-media filter bed with any number of layers of media.

One advantage of the differential pressure monitor 50 of the present invention is that it can be easily installed on an existing filter bed that is already in operation. To retro-fit the filter bed with a monitor 50, one can bring the filter bed to approach fluidization during a backwash procedure and then insert the monitor down to the top of the layer of support gravel C or to the top of an underdrain which has no layer of support gravel C. Accordingly, as shown in FIGS. 1 and 3, installation, use or removal of a monitor 50 of the present invention does not require any alteration of the filter basin 30 nor require anything to pass through the walls of the filter basin 30.

One such advantage of being able to install the differential pressure monitor 50 in such a user-friendly manner is that it can be used as a diagnostic tool for any filter bed. The monitor 50 can be taken to a plant and installed in a functioning filter and determine, from its past history whether the operator had been fully fluidizing the bed 38 or not. By backwashing the filter at the rate the operator normally uses and still having a differential pressure across the entire bed of filter media 36 would mean that the operator has not been properly fluidizing the bed 38.

From the foregoing description, it is clear that the differential pressure monitor 50 of the present invention can be used to measure the differential pressure across a filter bed so as to monitor the filter bed and achieve efficient control of filtration and backwashing procedures. This will undoubtedly lead to longer lives for filter beds and more efficient filtration systems.

The ability of the present invention to be easily installed and removed from a working filtration system allows for limitless applications. In the preferred embodiment described above for obtaining a characteristic profile of the filter bed 38, pressure sensors 56 are used to obtain pressure readings. Other diagnostic readings can be obtained, however, by using other sensors. For example, a turbidity monitor can be constructed by attaching turbidity sensors to the elongated body 70 of the present invention instead of pressure sensors 56 to perform a turbidity analysis of the filter bed 38. Other monitors can be constructed with other sensors, such as particle analysis, pH, chlorine residual or color sensors.

One advantage of the present invention is particularly important during analysis procedures such as turbidity analysis or particle analysis. Without a monitor according to the present invention, when filter media 36 breaks loose and sifts through the filter bed 38, there is significant lag time until it is discovered. With a monitor according to the preset invention, however, such a problem will be discovered much quicker because monitoring will take place at various levels of the filter bed 38.

Instead of obtaining diagnostic readings from sensors, other applications are possible. For example, the elongated body 70 of the present invention can be inserted in a working filter bed 38 to obtain water samples for analysis. With such a water sampling device, a pump to create suction such as a vacuum pump can easily draw water samples into the inner cavity 74 of the elongated body 70 through a path of fluid communication between the filter bed 38 and the inner cavity 74. Driven by the pump, the water sample will then move upward toward the open end 58 of the elongated body, and out of the filter bed 38 through a suitable conduit. Typically, a water sampling will comprise water and various particles of filter media 36.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A filter bed for a liquid filtration system, comprising:
   (a) an underdrain;
   (b) at least one layer of filter media situated on top of said underdrain;
   (c) a controller located outside the filter bed to determine pressure differentials from a plurality of pressure readings; and,
   (d) a differential pressure monitor located within the filter bed for measuring pressure at a plurality of heights in the filter bed, the monitor comprising:
      a body having an upper end and a lower end, said body having a generally uniform cross section;
      a plurality of pressure sensors located on said body for obtaining pressure readings at a plurality of corresponding heights across at least one layer of filter media wherein the monitor is at least partially submerged in the filter media; and,
      a transmitter to transmit the pressure readings from said pressure sensors to said controller.

2. The monitor of claim 1, wherein:
   (a) said body is elongated and has a cylindrical cross-section.

3. The filter bed of claim 1, wherein:
   (a) said lower end of said body is closed and one of the pressure sensors is disposed proximate said lower end.

4. The monitor of claim 1, wherein:
   (a) said plurality of sensors are pressure diaphragms.

5. The monitor of claim 1, wherein:
   (a) said monitor further includes a supporting member for holding said body in place in said filter bed, said supporting member having a first end and a second end, said first end being affixed to a filter basin of the liquid filtration system and the second end being affixed to a sidewall of the elongated body.

6. The monitor of claim 1, wherein:
   (a) said filter bed has an upper layer of filter media and a lower layer of filter media, said upper layer of filter media having a top surface and said lower layer of filter media having a bottom surface, and wherein there are three pressure sensors for obtaining pressure readings at three corresponding locations during filtration and for obtaining pressure readings at three locations during backwashing, the three locations being:
      (1) at a distance adjacent to and vertically above said upper layer of filter media so as to measure the pressure at the top surface of said upper layer of filter media;
      (2) at an interface of said upper layer of filter media and said lower layer of filter media; and,
      (3) at a point proximate the bottom surface of said lower layer of filter media.

7. A filter bed for a liquid filtration system, comprising:
   (a) a layer of support gravel;
   (b) at least one layer of filter media situated on top of said layer of support gravel;
   (c) a controller located outside the filter bed to determine pressure differentials from a plurality of pressure readings; and, (d) a differential pressure monitor located within the filter bed for measuring pressure at a plurality of heights in the filter bed, the monitor comprising:
a body having an upper end and a lower end;
a plurality of pressure sensors located on said body for obtaining pressure readings at a plurality of corresponding heights across said at least one layer of filter media wherein the monitor is at least partially submerged in the filter media; and,
a transmitter to transmit the pressure readings from said pressure sensor to said controller, wherein no part of said controller or said monitor passes through walls of the liquid filtration system.

8. A differential pressure monitor for measuring the pressure at a plurality of heights in a filter bed, the monitor comprising:
(a) a body having an upper end, a lower end, and at least one sidewall, said body having a generally uniform cross section;
(b) a plurality of pressure sensors located on the elongated body for obtaining pressure readings of pressures across the filter bed at a plurality of corresponding heights across a plurality of layers of filter media wherein the monitor is at least partially submerged in the filter media; and,
(c) a controller operable to determine at least one differential pressure, the differential pressure being the difference in the pressure across the filter bed between pressures measured by at least two of the sensors at different heights within the filter bed.

9. The monitor of claim 8, further including:
(a) a transmitter to transmit the pressure readings from the pressure sensors to said controller.

10. The monitor of claim 8, further including:
(a) a support member to hold said body in place to a filter bed, the support member having a first end and a second end, said first end being capable of being affixed to a filter basin and said second end being affixed to said at least one sidewall of said body.

11. The monitor of claim 8, wherein:
(a) said body is elongated and has a generally uniform cross section.

12. The monitor of claim 8, wherein:
(a) said lower end of said body is closed and one of the pressure sensors is disposed proximate said lower end.

13. The monitor of claim 8, wherein:
(a) said plurality of sensors are pressure diaphragms.

14. The monitor of claim 13, wherein:
(a) there are three pressure sensors located for obtaining pressure readings at three corresponding locations during filtration and for obtaining pressure readings at the three locations during backwashing, the three locations being:
(1) at a distance adjacent to and vertically above an upper layer of two layers of filter media so as to measure the pressure at a top surface of the upper layer of filter media;
(2) at an interface of the upper layer of filter media and the lower layer of the two layers of filter media; and
(3) at a point proximate a bottom surface of the lower layer of filter media.

15. A method of measuring at least one diagnostic reading at at least one location in a filter bed in a liquid filtration system, the filter bed having at least one layer of filter media and an upper surface at the top of the layer of filter media, the method comprising the steps of:
(a) providing a monitor comprising:
a body having an upper end and a lower end;
at least one sensor located on said body to obtain at least one diagnostic reading at at least one location in the filter bed;
(b) placing the monitor in the filter bed by positioning the monitor down through the upper surface of the filter bed and into the filter media; and,
(c) measuring at least one diagnostic reading at at least one location within the filter media in the filter bed with the monitor.

16. The method of claim 15, wherein:
(a) after step (c) in claim 15, removing the monitor from the filter bed by withdrawing the monitor through the upper surface of the filter bed.

17. A method of measuring of least one pressure reading at at least one location in a filter bed in a liquid filtration system, the filter bed having at least one layer of filter media and an upper surface at the top of the layer of filter media, the method comprising the steps of:
(a) providing a differential pressure monitor comprising:
a body having an upper end and a lower end;
at least one pressure sensor located on said body for obtaining at least one pressure reading at at least one location in the filter bed;
(b) placing the differential pressure monitor in the filter bed by positioning the monitor down through the upper surface of the filter bed and into the filter media; and,
(c) measuring at least one pressure reading at at least one location within the filter media in the filter bed with the differential pressure monitor.

18. The method of claim 17, wherein:
(a) the differential pressure monitor comprises at least two pressure sensors for measuring at least two pressure readings and step (c) of claim 17 comprises measuring at least two pressure readings at at least two locations in the filter bed with the differential pressure monitor.

19. The method of claim 18, wherein:
(a) the differential pressure monitor further comprises:
a controller; and,
a transmitter to transmit the at least two pressure readings from the at least two pressure sensors to the controller; and,
(b) wherein the method further comprises the step of determining at least one differential pressure from the at least two pressure readings by using the controller, the at least one differential pressure being the difference in pressure readings between pressure readings measured at two different locations in the filter bed.

20. The method of claim 19, further comprising the steps of:
(a) conducting a filtering operation within the filter bed; and,
(b) monitoring the at least one differential pressure during the filtering operation.

21. The method of claim 20, further comprising the step of:
(a) initiating a backwashing of the filter bed in response to the monitoring of the at least one differential pressure.

22. The method of claim 17, wherein:
(a) the differential pressure monitor comprises at least three pressure sensors for measuring at least three pressure readings and step (c) of claim 17 comprises measuring at least three pressure readings at at least three locations in the filter bed with the differential pressure monitor.

23. The method of claim 17, further comprising the step of:
(a) after step (c) in claim 17, removing the differential pressure monitor from the filter bed by withdrawing the monitor through the upper surface of the filter bed.

24. A method of monitoring and controlling performance of a filter bed in a liquid filtration system during filtration to achieve more efficient backwashing and filtration operation, the filter bed having two layers of filter media and an upper surface at the top of an upper layer of the two layers of filter media, the method comprising the steps of:
(a) providing a controller to determine a pressure differential from a plurality of pressure readings;
(b) providing a differential pressure monitor comprising:
a body having an upper end and a lower end;
three pressure sensors for obtaining pressure readings at three corresponding locations during filtration, the three locations being:
(1) at a distance adjacent to and vertically above the upper layer of filter media in the liquid filtration system so as to measure the pressure at the upper surface of the upper layer of filter media, the pressure being p1;
(2) at an interface of the upper layer of filter media and a lower layer of the two layers of filter media, the pressure being p2; and,
(3) at a point proximate a bottom surface of the lower layer of filter media, the pressure being p3; and
a transmitter to transmit the pressure readings from the pressure sensors to the controller, wherein the differential pressure is the difference in the pressure between pressures measured at two different heights;
(c) starting filtration by introducing influent to the liquid filtration system at a location vertically above the upper surface of the upper layer of filter media;
(d) monitoring pressure readings p1, p2, and p3 at periodic intervals and recording such measurements on the controller to obtain a characteristic profile of the filter bed during filtration, wherein no part of the controller or the monitor passes through a wall of the liquid filtration system.

25. The method of claim 24, wherein after step (d) of claim 24, when differential pressure p2−p3 increases non-linearly versus time, the method further includes the additional step of either:
(i) backwashing using a higher rate of water flow in an attempt to fully fluidize the filter bed during backwashing; or
(ii) backwashing for a longer period of time during backwashing.

26. The method of claim 24, wherein after step (d) of claim 24, when differential pressure p1−p2 increases non-linearly versus time, the method further includes the additional step of either:
(i) skimming more particles off the area proximate and vertically above the upper surface of the upper layer of filter media during backwashing; or
(ii) decreasing use of chemicals during filtration.

27. The method of claim 24, wherein after step (d) of claim 24, when differential pressure p2−p3 increases greater than p1−p2 increases, the method further includes the additional step of either:
(i) backwashing using a higher rate of water flow in an attempt to fully fluidize the filter bed during backwashing; or
(ii) backwashing for a longer period of time during backwashing.

28. The method of claim 24, wherein after step (d), the method further comprises the additional step of stopping filtration when differential pressure p1−p3 approaches critical head loss, the critical head loss being a point at which liquid is no longer being filtered.

29. A method of monitoring and controlling performance of a filter bed in a liquid filtration system during backwashing to achieve more efficient backwashing and filtration operation, the filter bed having two layers of filter media, an upper surface at an upper layer of filter media, a lower surface at a lower layer of filter media, and a bottom surface, the method comprising the steps of:
(a) providing a controller to determine a pressure differential from a plurality of pressure readings;
(b) providing a differential pressure monitor comprising:
a body having an upper end and a lower end;
three pressure sensors for obtaining pressure readings at three corresponding locations during backwashing, the three locations being;
(1) at a distance adjacent to and vertically above the upper layer of filter media so as to measure the pressure at the upper surface of the upper layer of filter media, the pressure being p1;
(2) at an interface of the upper layer of filter media and the lower layer of filter media, the pressure being p2; and,
(3) at a point proximate the lower surface of the lower layer of filter media, the pressure being p3; and, a
transmitter to transmit the pressure readings from the pressure sensors to the controller, wherein the differential pressure is the difference in pressure between pressures measured at two different heights;
(c) pumping water in an upward direction in through the bottom surface of the filter bed and through the filter bed at a relatively slow rate of flow;
(d) gradually increasing the rate of flow of water being pumped into the liquid filtration system;
(e) periodically measuring pressure readings p1, p2 and p3;
(f) recording the pressure readings on the controller to obtain a characteristic profile of the filter bed during backwashing; and,
(g) monitoring differential pressure p3−p1 to determine a backwash differential pressure and when it approaches a constant value, starting backwashing at the rate of water flow being pumped into the liquid filtration system to achieve the backwash differential pressure.

30. The method of claim 29, including the further step of:
(a) stopping backwashing when visual turbidity of water which has reached above the filter media layers reaches a level of relative clarity.

31. A method of measuring at least one turbidity reading at at least one location in a filter bed in a liquid filtration system, the filter bed having at least one layer of filter media and an upper surface at the top of the layer of filter media, the method comprising the steps of:
(a) providing a turbidity monitor comprising:
a body having an upper end and a lower end;
at least one turbidity sensor located on said body for obtaining at least one turbidity reading at at least one location in the filter bed;
(b) placing the turbidity monitor in the filter bed through the top of the liquid filtration system and into the filter media such that the monitor may be removed through the upper surface of the filter bed; and, (c) measuring at least one turbidity reading at at least one location within the filter media in the filter bed.

32. A method of obtaining at least one water sample at at least one location in a filter bed in a liquid filtration system, the filter bed having at least one layer of filter media and an upper surface at the top of the layer of filter media, the method comprising the steps of:

(a) providing a water sampling device comprising:
a body having an upper end and a lower end;
at least one path of fluid communication between the filter bed and the inner cavity;
a pump for creating suction to draw water out of the filter bed through the at least one path;

(b) placing the device at a location within the filter media in the filter bed by placing the device through the top of the liquid filtration system such that the monitor may be removed through the upper surface of the filter bed; and,;

(c) drawing at least one water sample out of the filter media within the filter bed, into said body, and out of the filter media within the filter bed.

33. A method of monitoring and controlling at least one condition of a filter bed in a liquid filtration system, the filter bed having at least one layer of filter media, the method comprising the steps of:

(a) providing a monitor for monitoring at least one condition of the filter bed;

(b) backwashing the filter bed; and, (c) inserting the monitor into the filter media during the step of backwashing.

* * * * *